United States Patent
Taniguchi et al.

(10) Patent No.: US 10,158,305 B2
(45) Date of Patent: Dec. 18, 2018

(54) INVERTER CONTROLLER AND MOTOR DRIVING SYSTEM

(71) Applicant: KABUSHIKI KAISHA TOSHIBA, Minato-ku (JP)

(72) Inventors: Shun Taniguchi, Fuchu (JP); Kazuaki Yuuki, Tokorozawa (JP); Kentaro Suzuki, Hachioji (JP); Tomoaki Shigeta, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/636,198

(22) Filed: Jun. 28, 2017

(65) Prior Publication Data

US 2017/0317623 A1 Nov. 2, 2017

Related U.S. Application Data

(63) Continuation of application No. PCT/JP2016/052161, filed on Jan. 26, 2016.

(30) Foreign Application Priority Data

Jan. 28, 2015 (JP) .................. 2015-014722

(51) Int. Cl.
  *H02P 6/182* (2016.01)
  *H02P 21/24* (2016.01)
  (Continued)

(52) U.S. Cl.
  CPC ............. *H02P 6/182* (2013.01); *H02P 6/18* (2013.01); *H02P 21/22* (2016.02); *H02P 21/24* (2016.02); *H02P 25/08* (2013.01)

(58) Field of Classification Search
  CPC ................. H02P 6/182; H02P 21/24
  (Continued)

(56) References Cited

U.S. PATENT DOCUMENTS 6,828,750 B2   12/2004   Nakazawa
8,159,163 B2    4/2012   Akiyama
(Continued)

FOREIGN PATENT DOCUMENTS

JP   2000-37099      2/2000
JP   2003-250293 A   9/2003
(Continued)

OTHER PUBLICATIONS

International Search Report dated May 10, 2016 in PCT/JP2016/052161, filed on Jan. 26, 2016.
(Continued)

*Primary Examiner* — Kawing Chan
*Assistant Examiner* — Bradley Brown
(74) *Attorney, Agent, or Firm* — Oblon, McClelland, Maier & Neustadt, L.L.P.

(57) ABSTRACT

An inverter controller according to an embodiment has an inverter main circuit, current detectors, a current command value calculator, a voltage command value calculator and an estimator. The inverter main circuit is capable of being electrically connected to a rotary drive target. The current detectors detect current values output from the inverter main circuit. The current command value calculator calculates current command values with which an output voltage output from the inverter main circuit becomes equal to or more than a target value. The voltage command value calculator calculates voltage command values with which the current values become equal to the current command values. The estimator calculates an estimated rotational phase angle of the rotary drive target, based on the voltage command values and the current values.

12 Claims, 13 Drawing Sheets

(51) Int. Cl.
   *H02P 6/18* (2016.01)
   *H02P 21/22* (2016.01)
   *H02P 25/08* (2016.01)
(58) Field of Classification Search
   USPC .................................................. 318/400.02
   See application file for complete search history.

(56) References Cited

U.S. PATENT DOCUMENTS

| | | | |
|---|---|---|---|
| 8,258,735 | B2 | 9/2012 | Kitanaka |
| 2001/0028236 | A1 | 10/2001 | Cheong |
| 2011/0175558 | A1* | 7/2011 | Kitanaka ............... B60L 15/025 318/400.3 |
| 2013/0049656 | A1* | 2/2013 | Yasui ...................... H02P 21/00 318/400.02 |

FOREIGN PATENT DOCUMENTS

| | | |
|---|---|---|
| JP | 3692085 B2 | 9/2005 |
| JP | 2006-74902 A | 3/2006 |
| JP | 2006-121768 | 5/2006 |
| JP | 2009-261103 | 11/2009 |
| JP | 2010-130751 | 6/2010 |
| JP | 2010-136586 | 6/2010 |
| JP | 2015-6067 | 1/2015 |
| WO | WO 2010/070723 A1 | 6/2010 |

OTHER PUBLICATIONS

European Office Action dated Aug. 31, 2018 in European Patent Application No. 167433549.

* cited by examiner

INVERTER CONTROLLER AND MOTOR DRIVING SYSTEM

CROSS REFERENCE TO RELATED APPLICATION

This application is a Continuation of International Application No. PCT/JP2016/052161, filed on Jan. 26, 2016, the entire contents of which are incorporated by reference herein.

FIELD

Embodiments of the present invention relate to an inverter controller and a motor driving system.

BACKGROUND

Conventionally, there has been used an estimation method of a rotational phase angle utilizing an induced voltage in a high-speed range in a rotational phase angle sensorless controller of a permanent magnet synchronous motor (PMSM) and a synchronous reluctance motor (SynRM). However, in the SynRM and the PMSM having small magnetic flux, even in the high-speed range, the induced voltage is small under a state of low load, so that there has been a problem that estimation accuracy of the rotational phase angle deteriorates.

DETAILED DESCRIPTION

An inverter controller according to an embodiment has an inverter main circuit, current detectors, a current command value calculator, a voltage command value calculator and an estimator. The inverter main circuit is capable of being electrically connected to a rotary drive target. The current detectors detect current values output from the inverter main circuit. The current command value calculator calculates current command values with which an output voltage output from the inverter main circuit becomes equal to or more than a target value. The voltage command value calculator calculates voltage command values with which the current values become equal to the current command values. The estimator calculates an estimated rotational phase angle of the rotary drive target, based on the voltage command values and the current values.

Hereinafter, embodiments of the present invention will be described with reference to the drawings.

(First embodiment)

Figure 1:
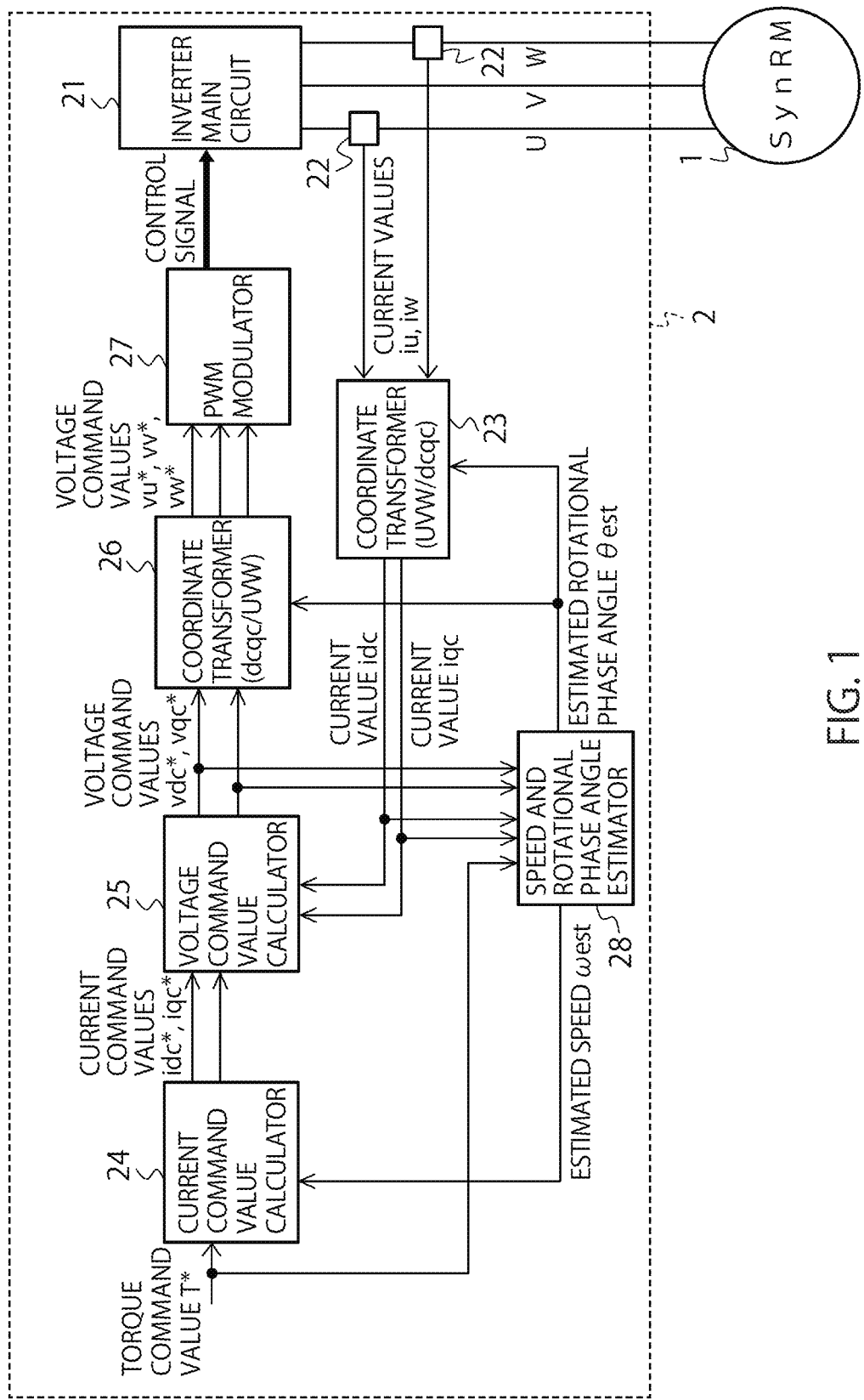
FIG. 1 is a diagram illustrating a configuration of a motor driving system according to a first embodiment.

A motor driving system (which is referred to as "system", hereinafter) according to a first embodiment will be described with reference to FIG. 1 to FIG. 13. FIG. 1 is a diagram illustrating a configuration of the system according to the present embodiment. As illustrated in FIG. 1, the system according to the present embodiment includes a motor 1 and an inverter controller 2.

The motor 1 is a rotary drive target of the controller 2, and is connected to the controller 2. Hereinafter, explanation will be made by citing a case where the motor 1 is a synchronous reluctance motor (which is referred to as "SynRM1", hereinafter), as an example. The SynRM1 includes a stator and a rotor. The stator has three excitation phases (U phase, V phase, and W phase). The stator generates a magnetic field with the use of a three-phase alternating current which flows through each excitation phase. The rotor does not have a permanent magnet. The rotor is rotated through a magnetic interaction with the magnetic field generated by the stator.

The inverter controller 2 (which is referred to as "controller 2", hereinafter) controls a rotational phase angle of the SynRM1 in a sensorless manner. As illustrated in FIG. 1, the controller 2 according to the present embodiment includes an inverter 21, current detectors 22, a coordinate transformer 23, a current command value calculator 24, a voltage command value calculator 25, a coordinate transformer 26, a PWM modulator 27, and a speed and rotational phase angle estimator 28.

The inverter 21 is a circuit including switching elements (transistors). The inverter 21 switches ON/OFF of the switching elements to convert power from a power source (whose illustration is omitted) into alternating-current power, and supplies it to the SynRM1. A control signal for controlling ON/OFF of the respective switching elements is input into the inverter 21 from the PWM modulator 27.

The current detectors 22 detect current values of two phases or three phases, in the three-phase alternating current flowing through the stator of the SynRM1. FIG. 1 illustrates a configuration in which current values iu, iw of two phases (U phase and W phase) are detected.

The coordinate transformer 23 performs coordinate transformation on the current values iu, iw detected by the current detectors 22, from a three-phase fixed coordinate system to a rotating coordinate system of dc and qc axes. Here, the three-phase fixed coordinate system and the rotating coordinate system of dc and qc axes will be described with reference to FIG. 2.

Figure 2:
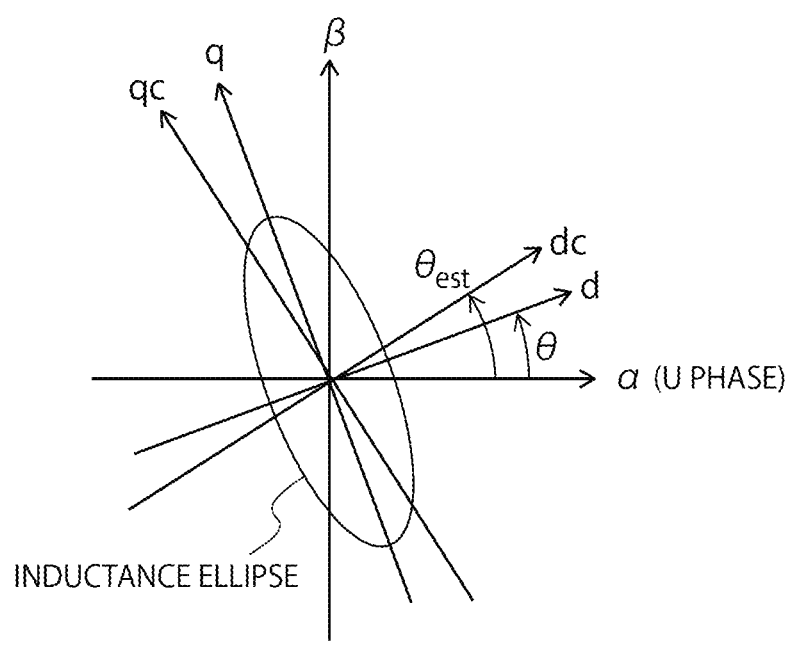
FIG. 2 is a diagram explaining a three-phase fixed coordinate system and a rotating coordinate system of dc and qc axes.

As illustrated in FIG. 2, the three-phase fixed coordinate system is a fixed coordinate system formed of an α axis and a β axis. In FIG. 2, the α axis is set in the U phase direction, and the β axis is set in a direction perpendicular to the α axis. The current values iu, iw detected by the current detectors 22 are represented on the three-phase fixed coordinates as described above.

On the contrary, the rotating coordinate system of dc and qc axes is a rotating coordinate system formed of a dc axis and a qc axis. The dc axis is set in a direction which is estimated by the controller 2 as a d axis direction (a direction in which an inductance of the rotor is minimum), and the qc axis is set in a direction which is estimated by the controller 2 as a q axis direction (a direction in which the inductance of the rotor is maximum). An inductance ellipse in FIG. 2 indicates an inductance of the rotor.

As illustrated in FIG. 2, the dc and qc axes, and the d and q axes do not always coincide. An actual rotational phase angle θ of the rotor is represented by an angle from the α axis to the d axis. Further, an estimated rotational phase angle θest of the rotor estimated by the controller 2 is represented by an angle from the α axis to the dc axis. It is indicated that the closer the angle between the rotational phase angle θ and the estimated rotational phase angle θest, the higher the estimation accuracy of the rotational phase angle.

The coordinate transformer 23 can transform the three-phase fixed coordinate system into the rotating coordinate system of dc and qc axes, by using the estimated rotational phase angle θest output by the speed and rotational phase angle estimator 28. Hereinafter, values obtained when the coordinate transformer 23 performs the coordinate transformation on the current values iu, iw are referred to as current values idc, iqc. The current value idc is a dc axis component of the current which flows through the stator, and the current value iqc is a qc axis component of the current which flows through the stator.

The current command value calculator 24 calculates current command values idc*, iqc*, based on a torque command value T* and an estimated speed ωest. The torque command value T* is a value of torque generated in the rotor. In the present embodiment, it is set that the torque command value T* is input from an external device. The estimated speed ωest indicates an angular speed of the rotor estimated by the controller 2. The current command value idc* is a dc axis component of the current which is flowed through the SynRM1. The current command value iqc* is a qc axis component of the current which is flowed through the SynRM1. Details of the current command value calculator 24 will be described later.

The voltage command value calculator 25 (current controller) calculates voltage command values vdc*, vqc* with which the current values idc, iqc of the SynRM1 become equal to the current command values idc*, iqc*. The voltage command value vdc* is a dc axis component of a voltage applied to the stator of the SynRM1. The voltage command value vqc* is a qc axis component of the voltage applied to the stator of the SynRM1.

The coordinate transformer 26 performs coordinate transformation on the voltage command values vdc*, vqc* output by the voltage command value calculator 25, from the rotating coordinate system of dc and qc axes to the three-phase fixed coordinate system. The coordinate transformer 26 can transform the rotating coordinate system of dc and qc axes into the three-phase fixed coordinate system by using the estimated rotational phase angle θest, in a similar manner to the coordinate transformer 23. Hereinafter, values obtained when the coordinate transformer 26 performs the coordinate transformation on the voltage command values vdc*, vqc*, are referred to as voltage command values vu*, vv*, vw*. The voltage command value vu* is a voltage applied to the U phase of the stator, the voltage command value vv* is a voltage applied to the V phase of the stator, and the voltage command value vw* is a voltage applied to the W phase of the stator.

The PWM modulator 27 modulates the voltage command values vu*, vv*, vw* through PWM (Pulse-Width Modulation) using a triangular wave, and generates a binary control signal corresponding to ON or OFF of each of the switching elements of the inverter 21. The PWM modulator 27 inputs the generated control signal into the inverter 21.

The speed and rotational phase angle estimator 28 (which is referred to as "estimator 28", hereinafter) estimates a speed ω and a rotational phase angle θ of the rotor of the SynRM1, based on the torque command value T*, the voltage command values vdc*, vqc*, and the current values idc, iqc, and calculates the estimated speed ωest and the estimated rotational phase angle θest.

Figure 3:
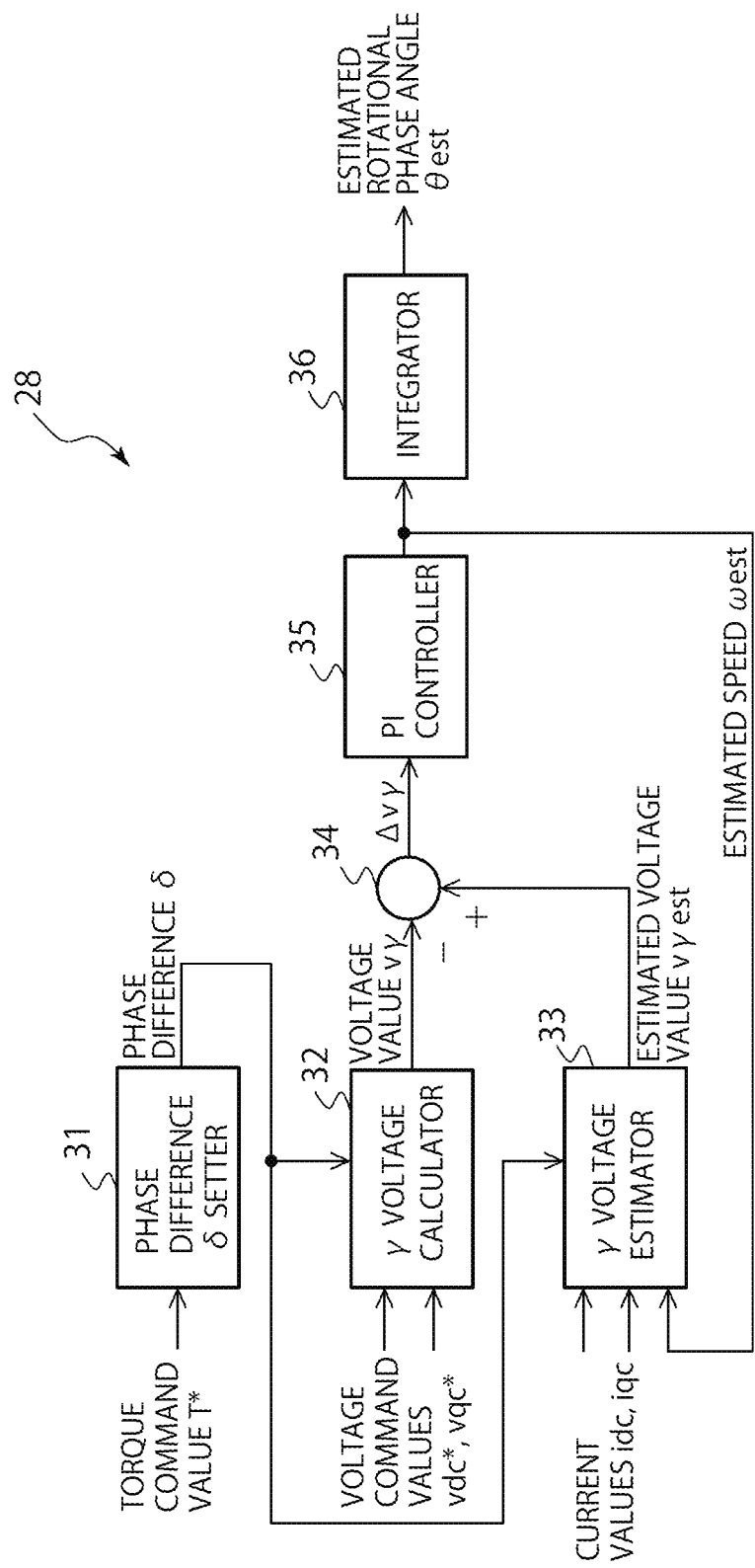
FIG. 3 is a diagram illustrating a configuration of a speed and rotational phase angle estimator in FIG. 1.

FIG. 3 is a diagram illustrating a configuration of the estimator 28. As illustrated in FIG. 3, the estimator 28 includes a phase difference δ setter 31, a γ voltage calculator 32, a γ voltage estimator 33, a subtracter 34, a PI controller 35, and an integrator 36.

The phase difference δ setter 31 outputs a phase difference δ in accordance with the torque command value T*, from previously stored plural phase differences δ. The phase difference δ indicates a value or a range of phase difference which causes the largest voltage variation due to influence of an error Δθ between the rotational phase angle θ and the estimated rotational phase angle θest. The plural phase differences δ are previously calculated in an analytic manner or experimental manner for each torque value, and stored in the phase difference δ setter 31.

The γ voltage calculator 32 calculates a voltage value $v_\gamma$ of a γ voltage, based on the voltage command values vdc*, vqc*, and the phase difference δ set (output) by the phase difference δ setter 31. The γ voltage is a feature amount which varies in accordance with the error Δθ. The voltage value $v_\gamma$ is calculated through the following expression, for example.

[Mathematical Expression 1]

$$v_\gamma = v_{dc}^* \cos(\delta) + v_{qc}^* \sin(\delta) \tag{1}$$

The voltage value $v_\gamma$ calculated by the γ voltage calculator 32 is input into the subtracter 34.

The γ voltage estimator 33 calculates an estimated voltage value $v_\gamma$est of the γ voltage, based on voltage values vdcest, vqcest, and the phase difference δ set (output) by the phase difference δ setter 31.

First, the γ voltage estimator 33 calculates the voltage values vdcest, vqcest, based on the current values idc, iqc, and the estimated speed ωest. The voltage value vdcest is an estimated value of the dc axis component of the voltage applied to the stator of the SynRM1. The voltage value vqcest is an estimated value of the qc axis component of the voltage applied to the stator of the SynRM1. The voltage values vdcest, vqcest are calculated through the following expression.

[Mathematical expression 2]

$$\begin{bmatrix} v_{dcest} \\ v_{qcest} \end{bmatrix} = \begin{bmatrix} R_m + pL_d & -\omega_{est}L_q \\ \omega_{est}L_d & R_m + pL_q \end{bmatrix} \begin{bmatrix} i_{dc} \\ i_{qc} \end{bmatrix} \quad (2)$$

In the expression (2), Rm indicates a winding resistance of the stator, Ld indicates an inductance in the d axis direction, Lq indicates an inductance in the q axis direction, and p indicates a differential operator (d/dt). The γ voltage estimator 33 previously stores these values.

Next, the γ voltage estimator 33 calculates the estimated voltage value v$_γ$est of the γ voltage, based on the voltage values vdcest, vqcest, and the phase difference δ. The estimated voltage value v$_γ$est is calculated through the following expression, for example.

[Mathematical expression 3]

$$v_{\gamma est} = v_{dcest}\cos(\delta) + v_{qcest}\sin(\delta) \quad (3)$$

The estimated voltage value v$_γ$est calculated by the γ voltage estimator 33 is input into the subtracter 34.

The subtracter 34 subtracts the voltage value v$_γ$ from the estimated voltage value v$_γ$est to calculate an error Δv$_γ$ of the γ voltage. The γ voltage varies in accordance with the error Δθ, so that the error Δv$_γ$ is in proportion to the error Δθ. The error Δv$_γ$ calculated by the subtracter 34 is input into the PI controller 35.

Note that by calculating the γ voltage through the expression (1), it is possible to improve linearity of the error Δv$_γ$ with respect to the error Δθ. Specifically, it is possible to enlarge a range of the error Δθ to which the error Δv$_γ$ is in proportion.

The PI controller 35 performs PI control to make the error Δv$_γ$ become 0, to thereby estimate the speed ω of the rotor and calculate the estimated speed ωest. The estimated speed ωest calculated by the PI controller 35 is sequentially fed back to the γ voltage estimator 33, and is also input into the integrator 36.

The integrator 36 integrates the estimated speed ωest calculated by the PI controller 35, and calculates the estimated rotational phase angle θest.

Through the configuration as described above, the estimator 28 can calculate the estimated speed ωest and the estimated rotational phase angle θest. The estimated speed ωest calculated by the estimator 28 is input into the current command value calculator 24. Further, the estimated rotational phase angle θest is input into the coordinate transformers 23, 26, and used for the coordinate transformation.

Note that the estimation method of the speed ω and the rotational phase angle θ performed by the estimator 28 is not limited to this, and any method can be selected from already-known estimation methods. For example, the estimator 28 may also estimate the rotational phase angle θ based on another method which uses a voltage generated by an interlinkage magnetic flux, it may also estimate the rotational phase angle θ by using the interlinkage magnetic flux itself, or it may also estimate the rotational phase angle θ by performing PI control so that a deviation of the q axis component of the current value becomes 0.

Here, the current command value calculator 24 will be described in detail. The current command value calculator 24 according to the present embodiment calculates current command values so that an output voltage of the SynRM1 becomes equal to or more than a predetermined target value V$_{SET}$. The target value V$_{SET}$ is a voltage value previously determined in an experimental manner or analytic manner, as an output voltage capable of accurately estimating the speed ω and the rotational phase angle θ.

Figure 4:
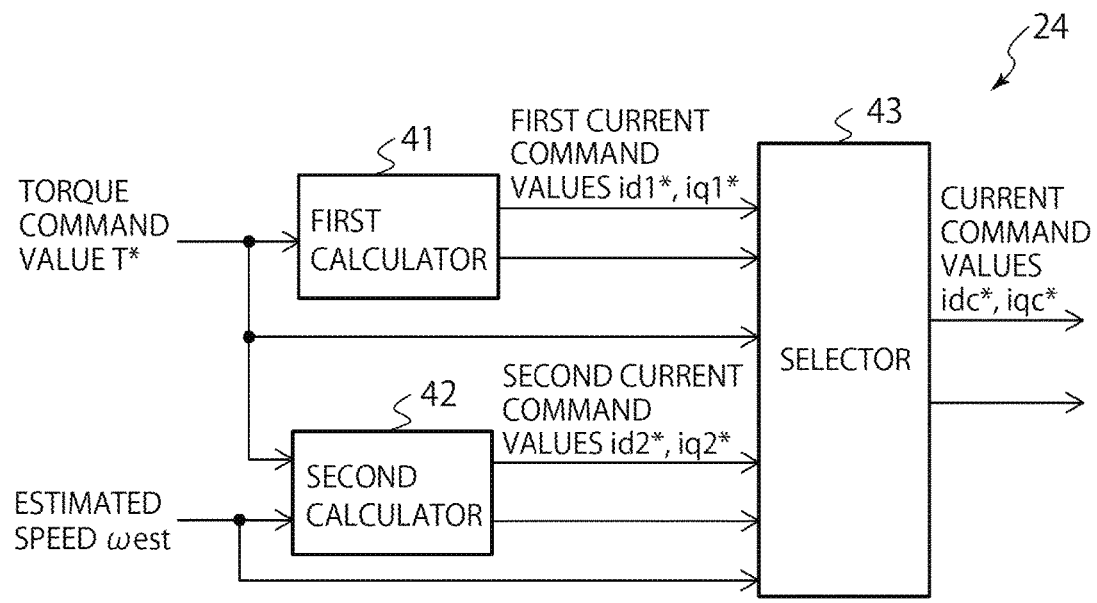
FIG. 4 is a diagram illustrating a configuration of a current command value calculator in FIG. 1.

Here, FIG. 4 is a diagram illustrating a configuration of the current command value calculator 24. As illustrated in FIG. 4, the current command value calculator 24 includes a first calculator 41, a second calculator 42, and a selector 43.

The first calculator 41 generates first current command values id1*, iq1*, based on the torque command value T*. The first current command value id1* is a dc axis component of the current which is flowed through the SynRM1. The first current command value iq1* is a qc axis component of the current which is flowed through the SynRM1. The first calculator 41 calculates the first current command values id1*, iq1*, so that a torque of the SynRM1 becomes the torque command value T*.

Figure 5:
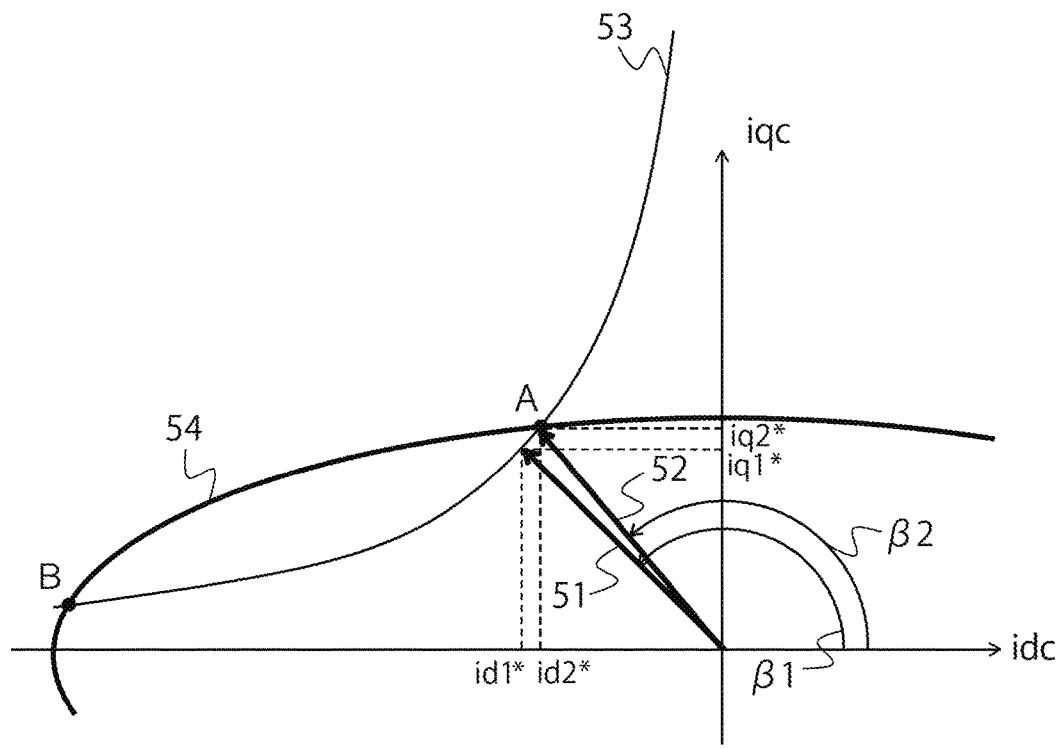
FIG. 5 is a diagram explaining a calculation method of current command values.

FIG. 5 is a diagram explaining a calculation method of the current command values. In FIG. 5, a horizontal axis indicates idc, a vertical axis indicates iqc, an arrow mark 51 indicates a first current vector, an arrow mark 52 indicates a second current vector, a curve 53 indicates an equal torque curve of the torque command value T*, and a curve 54 indicates an equal voltage ellipse of the target value V$_{SET}$.

The first current vector 51 is a vector corresponding to the first current command values id1*, iq1*. In the above description, the first current command values are represented by two values of (id1*, iq1*), but, they can also be represented by a magnitude of current (id1*$^2$+iq1*$^2$)$^{1/2}$ and a current phase angle β1. These representations can be mutually converted. The selection of any point on a plane in FIG. 5 corresponds to calculation (selection) of the first current command values.

As illustrated in FIG. 5, the first calculator 41 selects any point on the equal torque curve 53 of the torque command value T*, as the first current command values. The first calculator 41 can select the first current command values from a position on the equal torque curve 53, based on any method in accordance with control desired to be realized by the controller 2.

For example, the first calculator 41 selects the first current command values so that a magnitude of the current which is flowed through the stator (a magnitude of the first current vector) becomes minimum. In this case, the first calculator 41 may also select the first current command values with which the current phase angle β1 becomes 135 degrees, by ignoring magnetic saturation, or it may also select the first current command values with which the current phase angle 11 becomes a degree larger than 135 degrees, by taking the magnetic saturation into consideration. Further, the first calculator 41 may also select the first current command values so that efficiency and a power factor of the SynRM1 become maximum.

The first calculator 41 may also select the first current command values as described above by referring to a table in which the first current command values for each torque value are stored, or it may also determine the first current command values as described above by calculation. The first current command values calculated by the first calculator 41 are input into the selector 43.

The second calculator 42 calculates second current command values id2*, iq2*, based on the torque command value T* and the estimated speed ωest. The second current command value id2* is a dc axis component of the current which is flowed through the SynRM1. The second current command value iq2* is a qc axis component of the current which is flowed through the SynRM1. The second calculator 42 calculates the second current command values id2*, iq2*, so that the torque of the SynRM1 becomes the torque command value T* and the output voltage of the SynRM1 becomes the target value $V_{SET}$.

The second current vector 52 in FIG. 5 is a vector corresponding to the second current command values id2*, iq2*. In the above description, the second current command values are represented by two values of (id2*, iq2*), but, they can also be represented by a magnitude of current (id2*$^2$+iq2*$^2$)$^{1/2}$ and a current phase angle β2. These representations can be mutually converted. The selection of any point on the plane in FIG. 5 corresponds to calculation (selection) of the second current command values.

As illustrated in FIG. 5, the second calculator 42 selects, as the second current command values, any one of intersection points between the equal torque curve 53 of the torque command value T* and the equal voltage ellipse 54 of the target value $V_{SET}$. When there are two intersection points A, B, it is preferable that the second calculator 42 selects the intersection point A, as illustrated in FIG. 5.

The intersection point A indicates an intersection point on the iqc axis side (on the q axis side), between the two intersection points. Generally, the equal voltage ellipse 54 becomes wide in the d axis direction and becomes narrow in the q axis direction, so that if the intersection point A on the q axis side is selected, a magnitude of the current which is flowed through the stator (a magnitude of the second current vector) becomes small, when compared to a case where the intersection point B on the d axis side is selected. For this reason, when the second calculator 42 selects the intersection point A, it is possible to save power of the controller 2. Hereinafter, it is set that the second current command values correspond to the intersection point A.

Note that the second calculator 42 may also select the second current command values as described above by referring to a table in which the second current command values for each torque value are stored, or it may also determine the second current command values as described above by solving the following expression.

[Mathematical expression 4]

$$V_{SET} = \omega_{est}\sqrt{L_q^2 i_{q2}^2 + L_d^2 i_{d2}^2} \qquad (4)$$

The second current command values calculated by the second calculator 42 are input into the selector 43.

The selector 43 outputs the first current command values id1*, iq1* or the second current command values id2*, iq2*, as the current command values idc*, iqc*. First, the selector 43 determines whether or not an output voltage $V_1$ in accordance with the first current command values id1*, iq1* is lower than the target value $V_{SET}$. The output voltage $V_1$ indicates an output voltage of the SynRM1 when the first current command values are output as the current command values. The determination method will be described later.

Next, the selector 43 selects either of the first current command values id1*, iq1* or the second current command values id2*, iq2*, in accordance with the determination result, and outputs the selected values as the current command values idc*, iqc*.

When the output voltage $V_1$ is lower than the target value $V_{SET}$ ($V_1 < V_{SET}$), the selector 43 selects the second current command values id2*, iq2* as the current command values idc*, iqc*. The case where the output voltage $V_1$ is lower than the target value $V_{SET}$, indicates a case where the first current command values are included in the equal voltage ellipse 54, as illustrated in FIG. 5.

At this time, the second current command values are closer to the iqc axis (q axis) than the first current command values. Specifically, a current phase angle β2 of the second current command values is further on the iqc axis (q axis) side than the current phase angle β1 of the first current command values. Further, the q axis component iq2* of the second current command value is larger than the q axis component iq1* of the first current command value, and the d axis component id2* of the second current command value is smaller than the d axis component id1* of the first current command value.

On the other hand, when the output voltage $V_1$ is equal to or more than the target value $V_{SET}$ ($V_1 \geq V_{SET}$), the selector 43 selects the first current command values id1*, iq1* as the current command values idc*, iqc*. The case where the output voltage $V_1$ is equal to or more than the target value $V_{SET}$, indicates a case where the second current command values are on the equal voltage ellipse 54 or outside of the equal voltage ellipse 54.

At this time, the first current command values are closer to the iqc axis (q axis) than the second current command values. Specifically, the current phase angle β1 of the first current command values is further on the iqc axis (q axis) side than the current phase angle β2 of the second current command values. Further, the q axis component iq1* of the first current command value is larger than the q axis component iq2* of the second current command value, and the d axis component id1* of the first current command value is smaller than the d axis component id2* of the second current command value.

The selector 43 outputs the selected first current command values or second current command values as the current command values. The current command values output by the selector 43 are input into the voltage command value calculator 25.

Next, description will be made on the determination method performed by the selector 43, regarding whether or not the output voltage $V_1$ is lower than the target value $V_{SET}$.

The selector 43 obtains the output voltage $V_1$, and performs determination by comparing the output voltage $V_1$ with the target value $V_{SET}$, for example. The selector 43 may also select the output voltage $V_1$ by referring to a table in which the output voltage for each of the first current command values is stored, or it may also calculate the output voltage $V_1$ through the following expression.

[Mathematical expression 5]

$$V_1 = \omega_{est}\sqrt{L_q^2 i_{q1}^2 + L_d^2 i_{d1}^2} \qquad (5)$$

Further, it is also possible that the selector 43 performs the determination by comparing the current phase angle β1 of the first current command values with the current phase angle β2 of the second current command values. When the current phase angle β2 is further on the q axis side than the current phase angle β1, the selector 43 determines that the output voltage $V_1$ is lower than the target value $V_{SET}$.

Furthermore, it is also possible that the selector 43 performs the determination by comparing the q axis component iq1* of the first current command value with the q axis component iq2* of the second current command value. When the q axis component iq1* is smaller than the q axis component iq2*, the selector 43 determines that the output voltage $V_1$ is lower than the target value $V_{SET}$.

In addition, it is also possible that the selector 43 performs the determination by comparing the d axis component id1* of the first current command value with the d axis component id2* of the second current command value. When the d axis component id1* is larger than the d axis component id2*, the selector 43 determines that the output voltage $V_1$ is lower than the target value $V_{SET}$.

Figure 6:
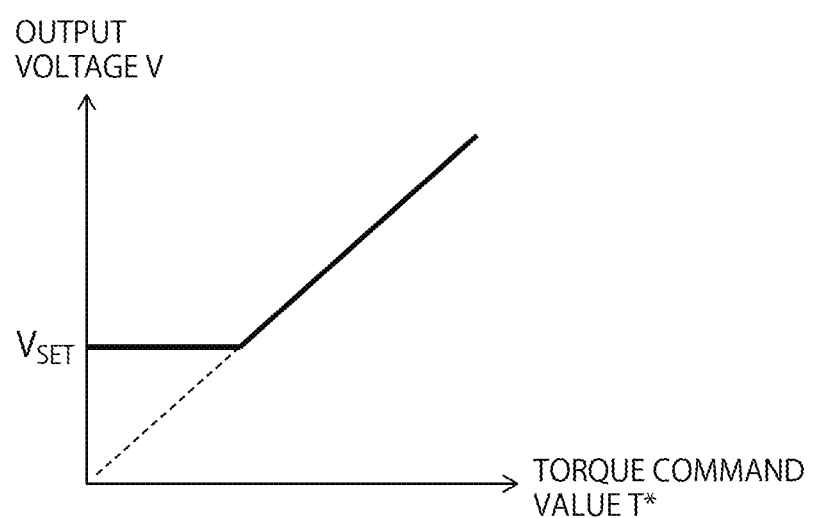
FIG. 6 is a diagram illustrating a relationship between a torque command value T* and an output voltage in a controller in FIG. 1.

When the current command value calculator 24 calculates the current command values idc*, iqc*, as described above, it is possible to set the output voltage of the SynRM1 to be equal to or more than the target value $V_{SET}$ with respect to any torque command value T*, as indicated by a solid line in FIG. 6.

In the conventional controller, even if the SynRM1 operates in a high-speed range, the output voltage (induced voltage) of the SynRM1 becomes small, as indicated by a dotted line in FIG. 6, in a state of low load in which the torque command value T* is small. For this reason, it has been difficult to estimate the speed ω and the rotational phase angle θ with good accuracy by utilizing the induced voltage.

However, the controller 2 according to the present embodiment can set the output voltage to be equal to or more than the target value $V_{ST}$ even in the case of low load, so that it can estimate the speed ω and the rotational phase angle θ of the SynRM1 with good accuracy based on the output voltage of the SynRM1.

Note that in the above description, the case where the controller 2 controls the operation of the SynRM1 is explained, but, this controller 2 can also be used as a controller of a PMSM with small magnetic flux. The PMSM with small magnetic flux has small induced voltage under a low load, similarly to the SynRM1. By applying the controller 2 according to the present embodiment to such a PMSM, it is possible to improve the estimation accuracy of the speed ω and the rotational phase angle θ of the PMSM under the low load.

(Modified example 1 of first embodiment)

Figure 7:
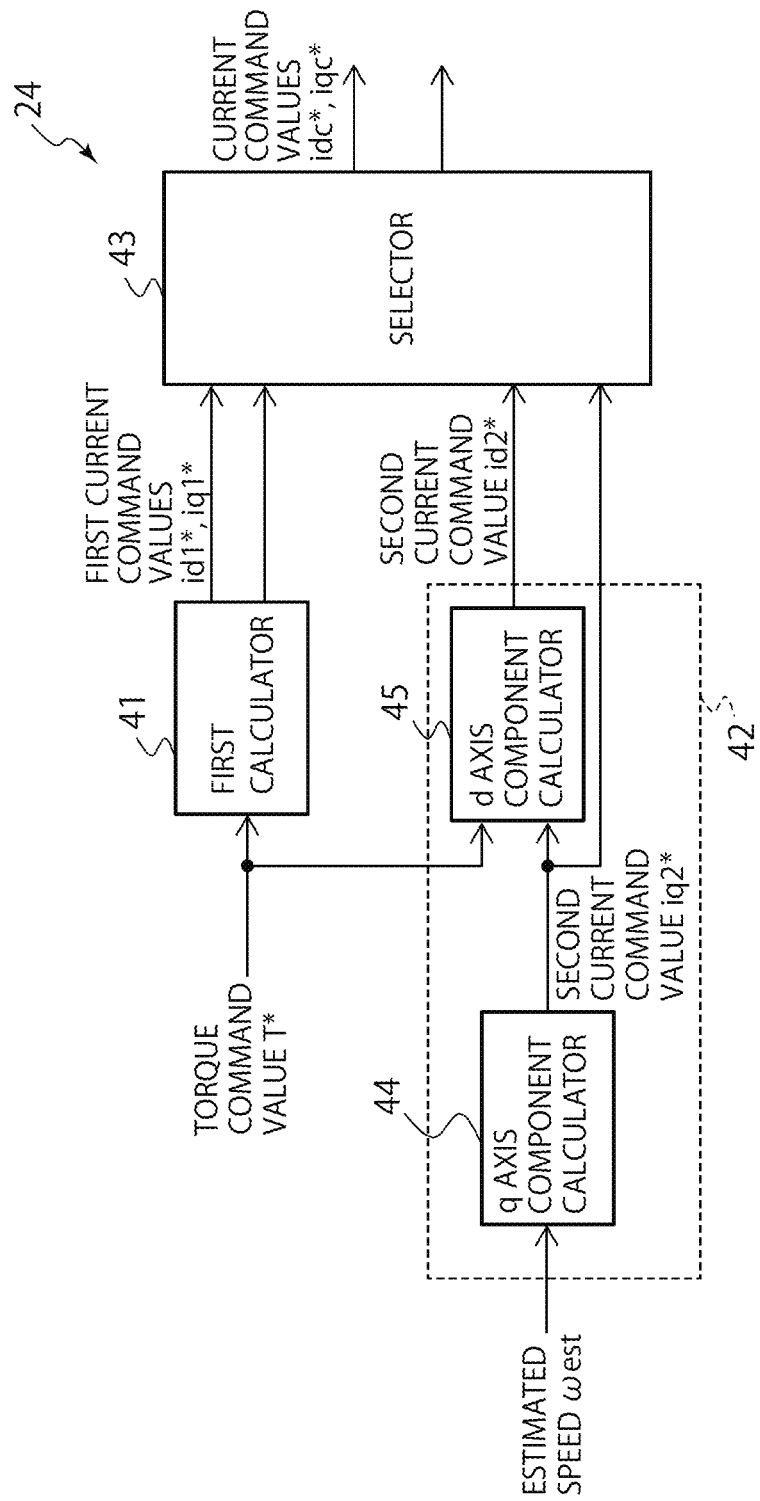
FIG. 7 is a diagram illustrating a configuration of a modified example 1 of the current command value calculator.

A modified example 1 of the current command value calculator 24 according to the present embodiment will be described while referring to FIG. 7. FIG. 7 is a diagram illustrating a configuration of the modified example 1 of the current command value calculator 24. As illustrated in FIG. 7, the second calculator 42 includes a q axis component calculator 44 and a d axis component calculator 45. The other configurations of the current command value calculator 24 are similar to those in FIG. 4.

The q axis component calculator 44 calculates the q axis component iq2* of the second current command value based on the estimated speed ωest. Concretely, the q axis component calculator 44 calculates the q axis component iq2* to make the current value iq2* to be in inverse proportion to the estimated speed ωest. The q axis component iq2* is calculated through the following expression, for example.

[Mathematical expression 6]

$$i_{q2}^* = \frac{V_{SET}}{\omega_{est} L_q} \quad (6)$$

The d axis component calculator 45 calculates the d axis component id2* of the second current command value based on the torque command value T* and the q axis component iq2*. The d axis component id2* is calculated through the following expression, for example.

[Mathematical expression 7]

$$i_{d2}^* = \frac{(L_d - L_q) T^*}{i_{q2}^*} \quad (7)$$

Through the configuration as described above, the controller 2 can set the output voltage under the low load to be equal to or more than the target value $V_{SET}$. Further, it is possible to suppress a current loss in a high-speed range.

(Modified example 2 of first embodiment)

Figure 8:
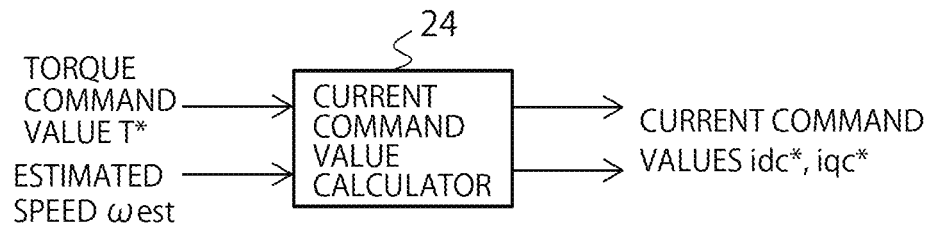
FIG. 8 is a diagram illustrating a configuration of a modified example 2 of the current command value calculator.

A modified example 2 of the current command value calculator 24 according to the present embodiment will be described while referring to FIG. 8 to FIG. 10. FIG. 8 is a diagram illustrating a configuration of the modified example 2 of the current command value calculator 24. As illustrated in FIG. 8, the current command value calculator 24 calculates the current command values iqc*, idc*, based on the torque command value T* and the estimated speed ωest.

Figure 9:
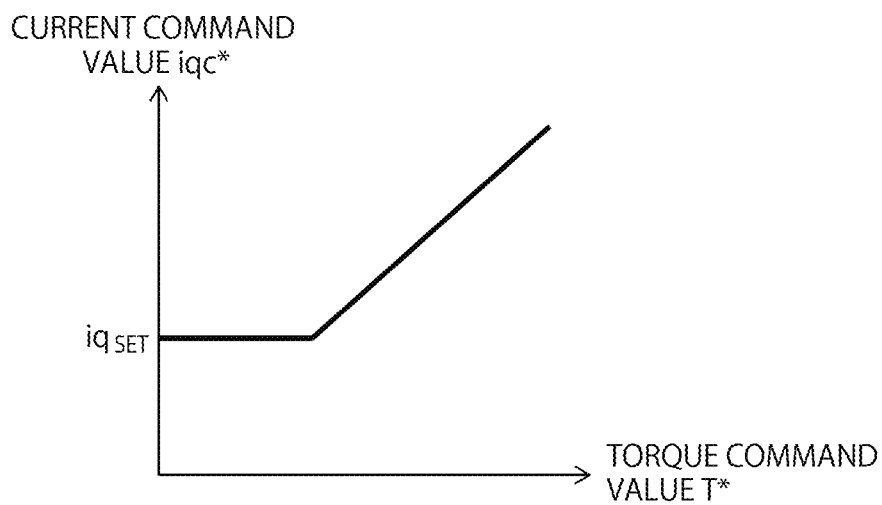
FIG. 9 is a diagram explaining a calculation method of a current command value in the modified example 2.
Figure 10:
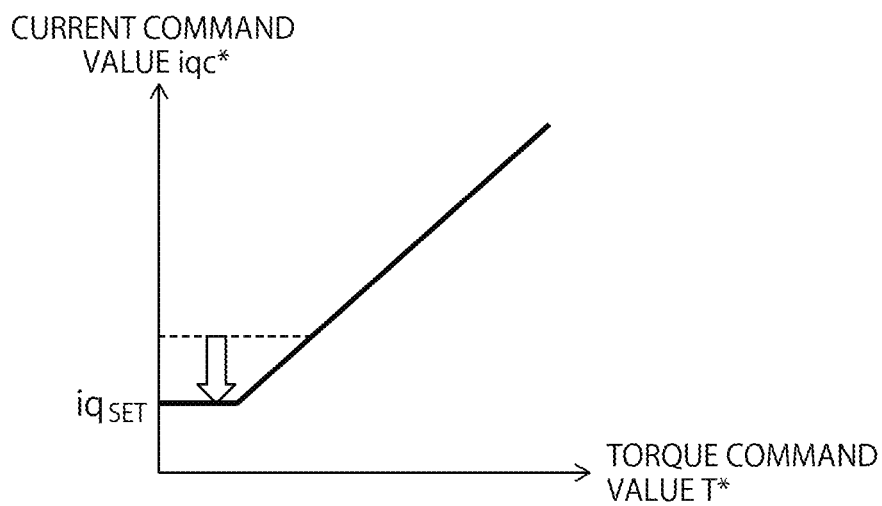
FIG. 10 is a diagram explaining a calculation method of the current command value in the modified example 2.

In the present modified example, the current command value calculator 24 calculates the q axis component iqc* of the current command value so that the q axis component iqc* becomes equal to or more than a predetermined target value $iq_{SET}$, as illustrated in FIG. 9. Further, the current command value calculator 24 generates the q axis component iqc* so that the target value $iq_{SET}$ becomes small as the estimated speed ωest increases, as illustrated in FIG. 10.

Through the configuration as described above, it is possible to set the output voltage of motor under the low load to be equal to or more than the target value $V_{SET}$. Further, it is possible to suppress the current loss in the high-speed range.

(Modified example 3 of first embodiment)

A modified example 3 of the current command value calculator 24 according to the present embodiment will be described while referring to FIG. 11 and FIG. 12. The current command value calculator 24 described above selects one of the two sets of current command values to calculate the current command values with which the output voltage becomes equal to or more than the target value $V_{SET}$. On the contrary, in the present modified example, one current command value is corrected to calculate the current command values with which the output voltage becomes equal to or more than the target value $V_{SET}$.

Figure 11:
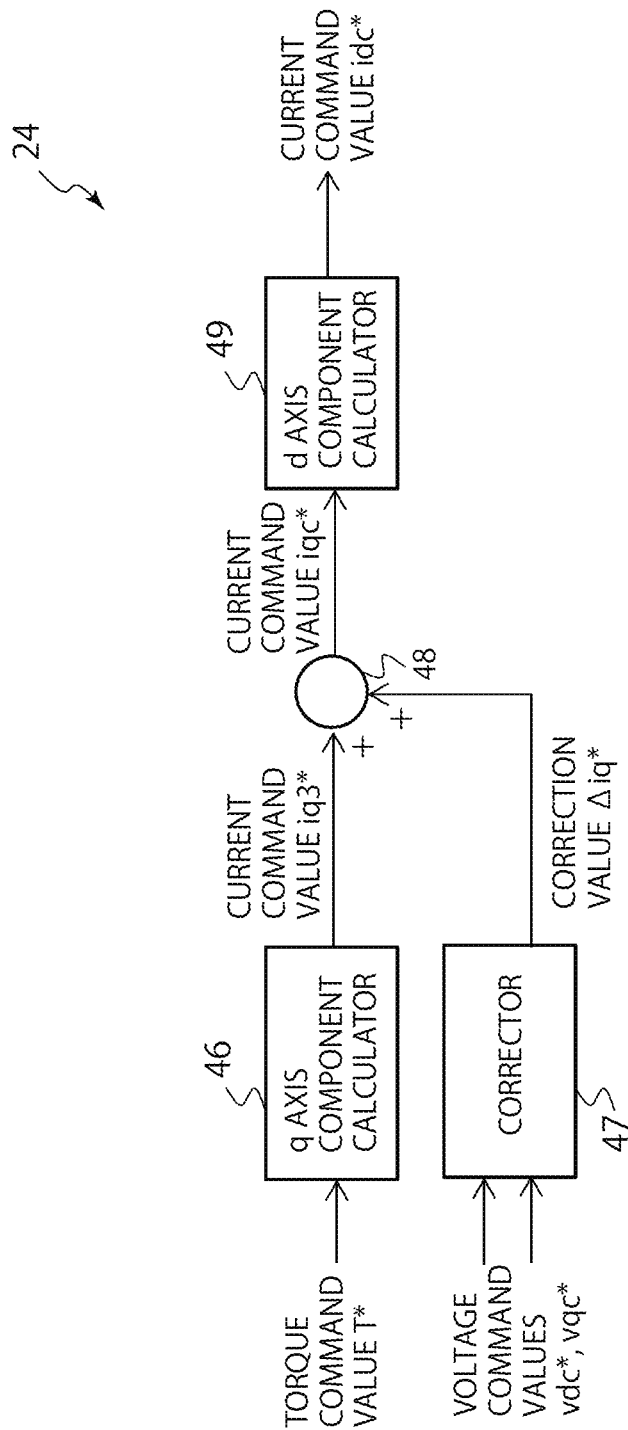
FIG. 11 is a diagram illustrating a configuration of a modified example 3 of the current command value calculator.
Figure 12:
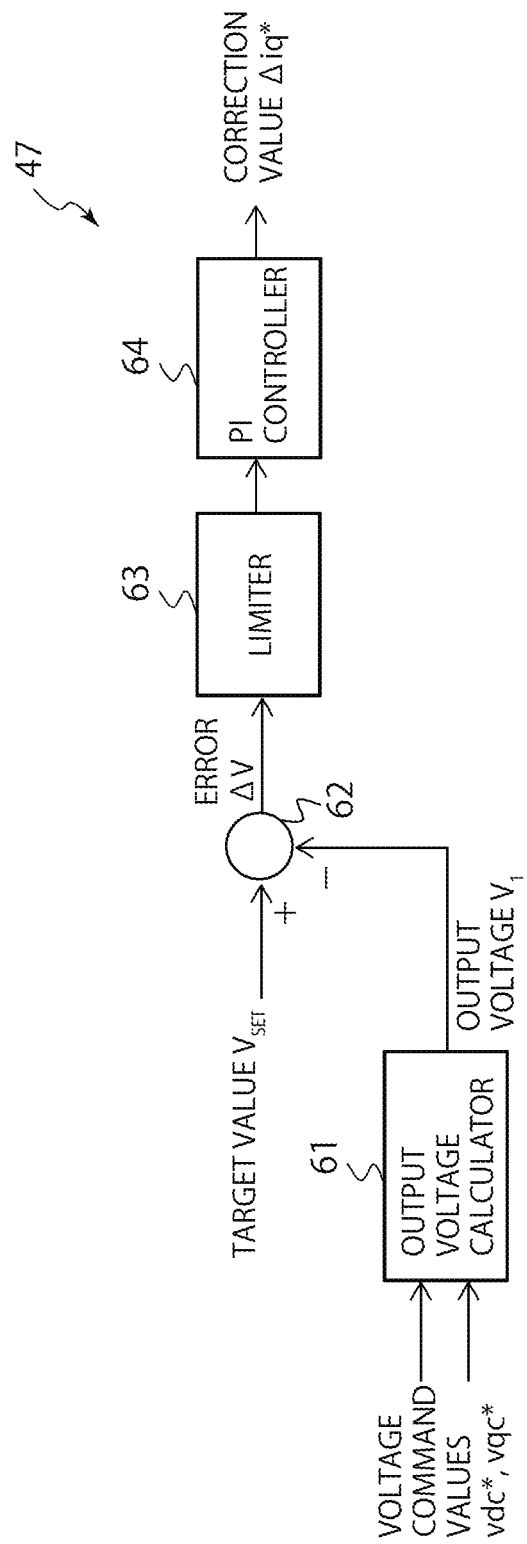
FIG. 12 is a diagram illustrating a configuration of a corrector.

FIG. 11 is a diagram illustrating a configuration of the modified example 3 of the current command value calculator 24. As illustrated in FIG. 11, the current command value calculator 24 includes a q axis component calculator 46, a corrector 47, an adder 48, and a d axis component calculator 49.

The q axis component calculator 46 calculates a current command value iq3* based on the torque command value T*. The current command value iq3* is a value before correction of the q axis component of the current command value. The current command value calculator 24 in the present modified example corrects the current command value iq3*, thereby calculating the q axis component of the current command value. The current command value iq3* is calculated by any method in accordance with control desired to be realized by the controller, so that the torque of the SynRM1 becomes the torque command value T*.

For example, the q axis component calculator 46 calculates the current command value iq3* so that a magnitude of the current which is flowed through the stator becomes minimum. In this case, the q axis component calculator 46 may also calculate the current command value iq3* with which the current phase angle β becomes 135 degrees, by ignoring magnetic saturation, or it may also calculate the current command value iq3* with which the current phase angle β becomes a degree larger than 135 degrees, by taking the magnetic saturation into consideration. Further, the q axis component calculator 46 may also calculate the current command value iq3* so that the efficiency and the power factor of the SynRM1 become maximum.

The current command value iq3* calculated by the q axis component calculator 46 is input into the adder 48.

The voltage command values vdc*, vqc* are input into the corrector 47 from the voltage command value calculator 25. The corrector 47 calculates a correction value Δiq*, based on the voltage command values vdc*, vqc*. The correction value Δiq* is a current command value for calculating the q axis component iqc* of the current command value by correcting the current command value iq3*. Details of the corrector 47 will be described later. The correction value Δiq* calculated by the corrector 47 is input into the adder 48.

The adder 48 adds the correction value Δiq* to the current command value iq3*, to thereby calculate the current command value iqc*. The current command value iqc* calculated by the adder 48 is input into the d axis component calculator 49.

The d axis component calculator 49 calculates the d axis component idc* of the current command value based on the torque command value T* and the current command value iqc*, so that the torque of the SynRM1 becomes the torque command value T*. The d axis component idc* is calculated through the following expression, for example.

[Mathematical expression 8]

$$i_{dc}^* = \frac{(L_d - L_q)T^*}{i_{qc}^*} \quad (8)$$

Here, the corrector 47 will be described with reference to FIG. 12. FIG. 12 is a diagram illustrating a configuration of the corrector 47. As illustrated in FIG. 12, the corrector 47 includes an output voltage calculator 61, a subtracter 62, a limiter 63, and a PI controller 64.

The voltage command values vdc*, vqc* calculated by the voltage command value calculator 25 are input into the output voltage calculator 61. The output voltage calculator 61 calculates the output voltage $V_1$ of the SynRM1, based on the voltage command values vdc*, vqc*. The output voltage $V_1$ is calculated through the following expression, for example.

[Mathematical expression 9]

$$V_1 = \sqrt{v_{dc}^{*2} + v_{qc}^{*2}} \quad (9)$$

The output voltage $V_1$ calculated by the output voltage calculator 61 is input into the subtracter 62.

The subtracter 62 subtracts the output voltage $V_1$ from the target value $V_{SET}$ of the output voltage, thereby calculating an error ΔV of the output voltage. The error ΔV calculated by the subtracter 62 is input into the limiter 63.

The limiter 63 limits the error ΔV to 0 or more. Namely, the limiter 63 outputs only the error ΔV of 0 or more. The error ΔV output by the limiter 63 is input into the PI controller 64.

The PI controller 64 performs PI control based on the error ΔV which is limited to 0 or more, to thereby calculate the correction value Δiq* with which the output voltage $V_1$ of the SynRM1 becomes equal to or more than the target value $V_{SET}$. The correction value Δiq* calculated by the PI controller 64 is input into the adder 48.

Through the configuration as described above, when the output voltage $V_1$ in accordance with the current command values is lower than the target value $V_{SET}$, namely, when ΔV is 0 or more, the correction value Δiq* is added to the current command value as an offset current to make the output voltage $V_1$ to be equal to or more than the target value $V_{SET}$. Consequently, it is possible to set the output voltage $V_1$ under the low load to be equal to or more than the target value $V_{SET}$.

(Modified example 4 of first embodiment)

Figure 13:
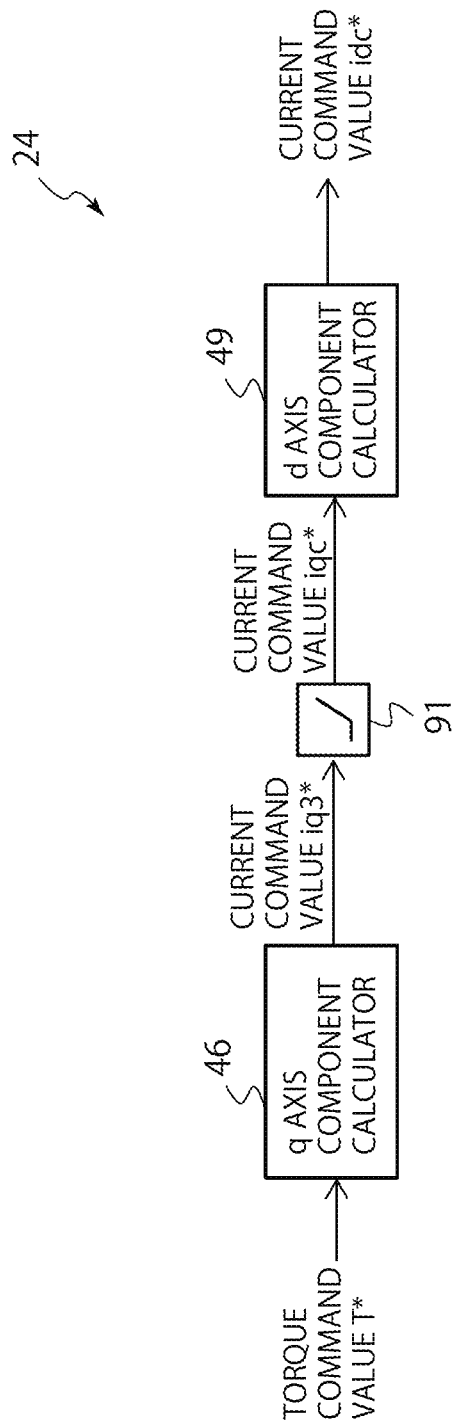
FIG. 13 is a diagram illustrating a configuration of a modified example 4 of the current command value calculator.

A modified example 4 of the current command value calculator 24 according to the present embodiment will be described while referring to FIG. 13. In the present modified example, one current command value is corrected to calculate the current command values with which the output voltage becomes equal to or more than the target value $V_{SET}$, in a similar manner to the modified example 3. In the modified example 3, the correction value Δiq* is generated by the corrector 47, and the correction value Δiq* is added to the current command value iq3* in the adder 48, to thereby generate the current command value iqc*. On the contrary, in the present modified example, a lower limit of the current command value iq3* is limited by a lower-limit limiter 91, to thereby generate the current command value iqc*.

The lower-limit limiter 91 corrects (limits) the iq3* so that the iqc* becomes equal to or more than the $iq_{SET}$, as illustrated in FIG. 9. The $iq_{SET}$ is calculated from a minimum speed $\omega_{MIN}$ when the present example is used, for example, and the target value $V_{SET}$ of the output voltage, through the following expression.

[Mathematical expression 10]

$$i_{qSET} = \frac{V_{SET}}{L_q \omega_{MIN}} \quad (10)$$

Through the configuration as described above, it is possible to set the output voltage $V_1$ to be equal to or more than the target value $V_{SET}$, even under the low load. In the present modified example, it is possible to set the output voltage $V_1$ to be equal to or more than the target value $V_{SET}$, with the simple configuration realized by only adding the lower-limit limiter 91 to the first embodiment and each of the modified examples 1 to 3.

(Second embodiment)

Figure 14:
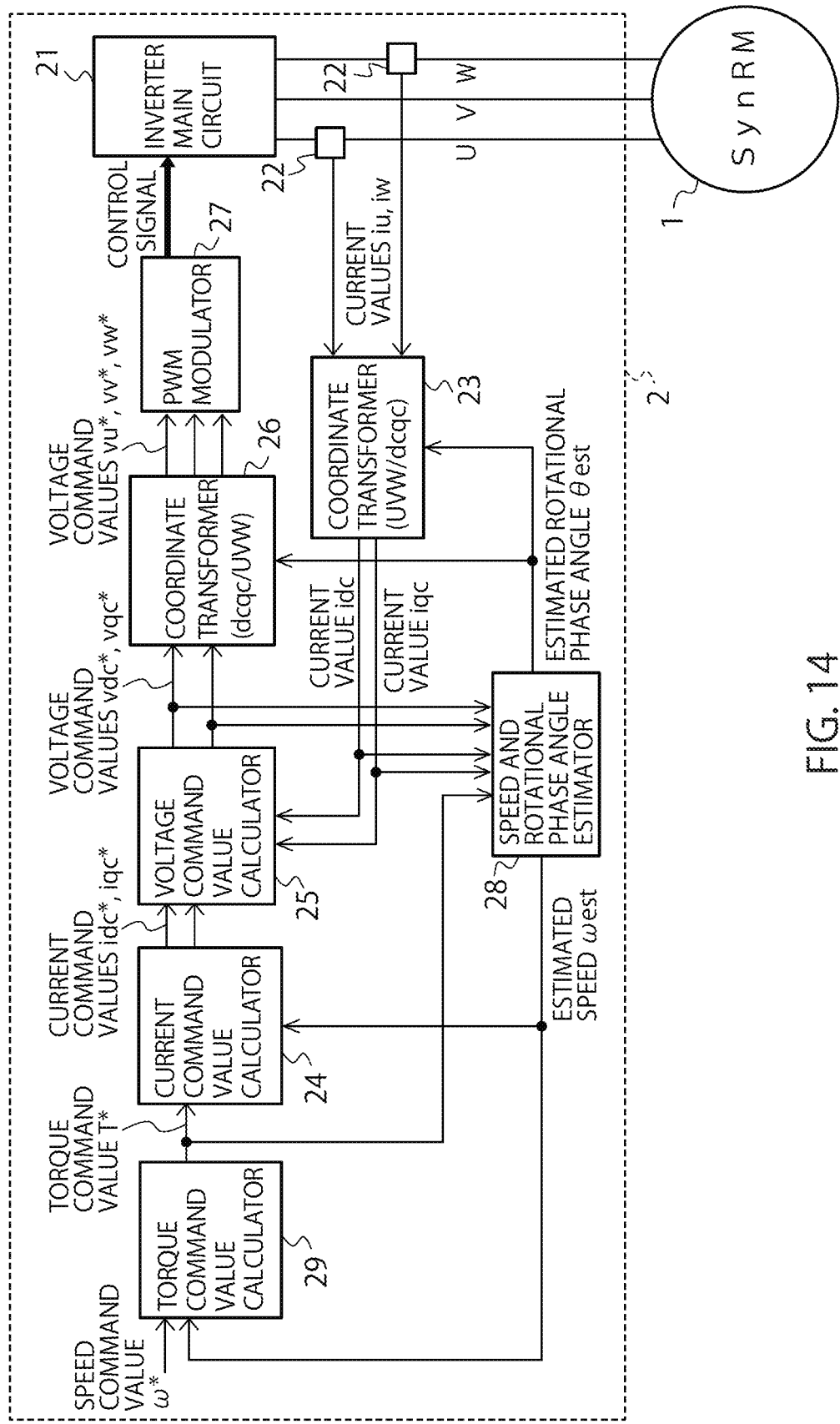
FIG. 14 is a diagram illustrating a configuration of a motor driving system according to a second embodiment.

Next, a controller 2 according to a second embodiment will be described while referring to FIG. 14 to FIG. 16. FIG. 14 is a diagram illustrating a configuration of a system according to the present embodiment. As illustrated in FIG. 14, the controller 2 according to the present embodiment further includes a torque command value calculator 29. The other configurations are similar to those of the first embodiment.

The torque command value calculator (speed controller) 29 calculates the torque command value T* based on a speed command value ω* and the estimated speed ωest. The speed command value ω* indicates an angular speed of rotating the rotor of the SynRM1. In the present embodiment, the torque command value T* calculated by the torque command value calculator 29 is input into the current command value calculator 24. Note that in the present embodiment, it is set that the speed command value ω* is input from an external device.

Figure 15:
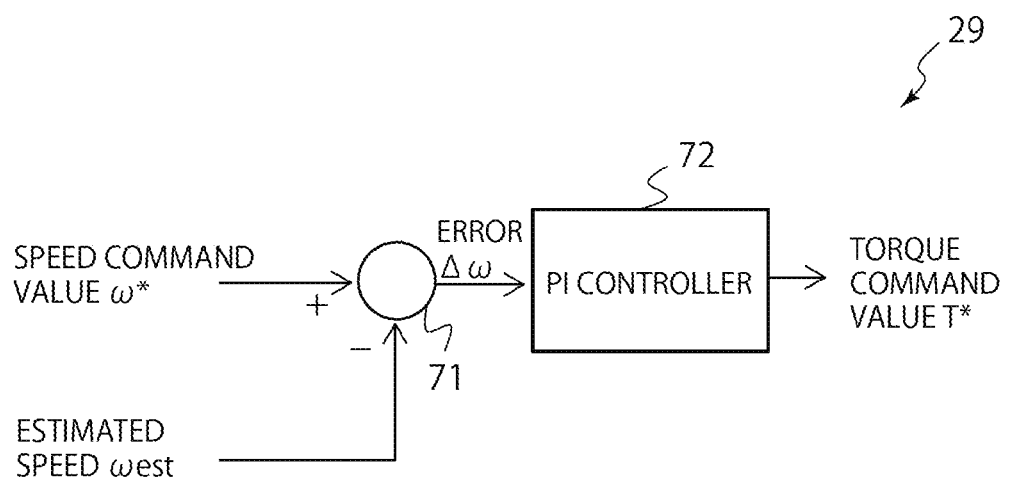
FIG. 15 is a diagram illustrating a configuration of a torque command value calculator in FIG. 14.

FIG. 15 is a diagram illustrating a configuration of the torque command value calculator 29. As illustrated in FIG. 15, the torque command value calculator 29 includes a subtracter 71, and a PI controller 72.

The speed command value ω* and the estimated speed ωest are input into the subtracter 71. The subtracter 71 subtracts the estimated speed ωest from the speed command value ω*, to thereby calculate an error Δω of the angular speed of the rotor. The error Δω calculated by the subtracter 71 is input into the PI controller 72.

The PI controller 72 performs PI control based on the error Δω, and calculates the torque command value T* with which the error Δω becomes 0. The torque command value T* calculated by the PI controller 72 is input into the current command value calculator 24.

As described above, the current command value calculator 24 may also have the configuration described in the first embodiment, but, it may also have another configuration. FIG. 16 is a diagram illustrating another configuration of the current command value calculator 24. The current command value calculator 24 calculates the current command values idc*, iqc*, based on the torque command value T* and a phase angle command value β*.

Figure 16:
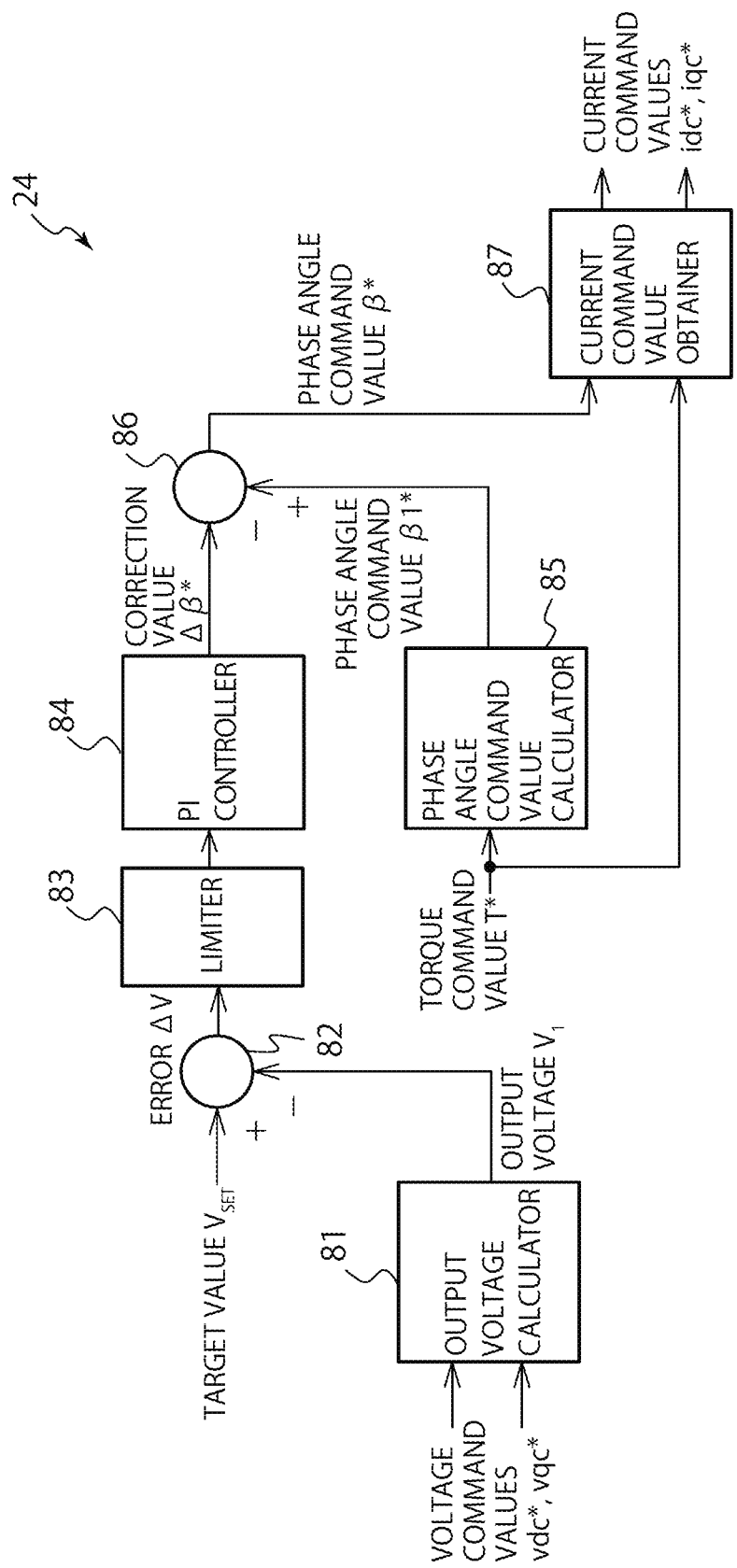
FIG. 16 is a diagram illustrating a configuration of a current command value calculator in FIG. 14.

As illustrated in FIG. 16, the current command value calculator 24 includes an output voltage calculator 81, a subtracter 82, a limiter 83, a PI controller 84, a phase angle command value calculator 85, a subtracter 86, and a current command value obtainer 87.

The voltage command values vdc*, vqc* calculated by the voltage command value calculator 25 are input into the output voltage calculator 81. The output voltage calculator 81 calculates the output voltage $V_1$ of the SynRM1, based on the voltage command values vdc*, vqc*. The output voltage $V_1$ calculated by the output voltage calculator 81 is input into the subtracter 82.

The subtracter 82 subtracts the output voltage $V_1$ from the target value $V_{SET}$ of the output voltage, to thereby calculate an error ΔV of the output voltage. The error ΔV calculated by the subtracter 82 is input into the limiter 83.

The limiter 83 limits the error ΔV to 0 or more. Namely, the limiter 83 outputs only the error ΔV of 0 or more. The error ΔV output by the limiter 83 is input into the PI controller 84.

The PI controller 84 performs PI control based on the error ΔV which is limited to 0 or more, to thereby calculate a correction value Δβ* with which the output voltage $V_1$ of the SynRM1 becomes equal to or more than the target value $V_{SET}$. The correction value Δβ* is a phase angle command value for calculating the phase angle command value β* by correcting the phase angle command value β1*. The correction value Δβ* calculated by the PI controller 84 is input into the subtracter 86.

The phase angle command value calculator 85 calculates the phase angle command value β1* based on the torque command value T*. The phase angle command value β1* is a value before correction of the phase angle command value β*. The phase angle command value β1* is calculated by any method in accordance with control desired to be realized by the controller, so that the torque of the SynRM1 becomes the torque command value T*.

For example, the phase angle command value calculator 85 calculates the phase angle command value β1* so that a magnitude of the current which is flowed through the stator becomes minimum. In this case, the phase angle command value calculator 85 may also set the phase angle command value β1* to 135 degrees, by ignoring magnetic saturation, or it may also set the phase angle command value β1* to a degree larger than 135 degrees, by taking the magnetic saturation into consideration. Further, the phase angle command value calculator 85 may also calculate the phase angle command value β1* so that the efficiency and the power factor of the SynRM1 become maximum.

The phase angle command value β1* calculated by the phase angle command value calculator 85 is input into the subtracter 86.

The subtracter 86 subtracts the correction value Δβ* from the phase angle command value β1*, to thereby calculate the phase angle command value β*. The phase angle command value β* calculated by the subtracter 86 is input into the current command value obtainer 87.

The current command value obtainer 87 calculates the current command values idc*, iqc*, based on the torque command value T* and the phase angle command value β*. Concretely, the current command value obtainer 87 is only required to obtain coordinates of a point, on the equal torque curve of the toque command value T*, at which the current phase angle becomes the phase angle command value β*. The current command values idc*, iqc* obtained by the current command value obtainer 87 are input into the voltage command value calculator 25.

As described above, the current command value calculator 24 in FIG. 16 corrects the current phase angle so that the output voltage $V_1$ becomes equal to or more than the target value $V_{SET}$. Concretely, the current command value calculator 24 corrects the current phase angle in a delay direction so that the current command values are shifted to the q axis side. Consequently, it is possible to make the output voltage $V_1$ under the low load to be equal to or more than the target value $V_{SET}$.

Further, the required accuracy of torque control with respect to the controller 2 according to the present embodiment is lower than that with respect to the first embodiment. This is because the controller 2 according to the present embodiment performs control to make the speed ω, of the SynRM1 to be the speed command value ω*.

For this reason, the current command value calculator 24 can calculate the current command values without using a table for correctly controlling the torque of the SynRM1 (a table in which the output voltage for each of the current command values is stored, or the like).

It should be noted that the present invention is not limited to the above-described respective embodiments as they are, but may be embodied with components being modified in a range not departing from the contents thereof at the stage of implementation. Further, various inventions can be formed by appropriately combining a plurality of components disclosed in the above-described respective embodiments. Further, for example, there can be considered a configuration in which some of all the components shown in the respective embodiments are deleted. Further, components described in different embodiments can be combined appropriately.

The invention claimed is:

1. An inverter controller, comprising:
an inverter circuit which drives a rotary device;
current detectors which detect current values output from the inverter circuit;
a current command value calculator which calculates current command values so that an output voltage generated by the rotary device based on a current output from the inverter circuit becomes equal to or more than a given value;
a voltage command value calculator which calculates voltage command values so that the current values become equal to the current command values; and
an estimator which estimates a rotational phase angle of the rotary device, based on the voltage command values and the current values, wherein the current command value calculator calculates first current command values based on a torque command value and second current command values based on the torque command value and an estimated speed, respectively, determines whether the output voltage in accordance with the first current command values is lower than the given value, outputs the first current command values as the current command values when the output voltage in accordance with the first current command values is equal to or more than the given value, and outputs the second current command values as the current command values when the output voltage in accordance with the first current command values is lower than the given value.

2. The inverter controller according to claim 1, wherein the output voltage in accordance with the second current command values is used as the given value.

3. The inverter controller according to claim 1, wherein the current command value calculator calculates the first current command values based on a torque command value and the second command values based on the torque command value and an estimated speed, respectively, and outputs the first current command values or the second current command values, whose current phase angle is closer to a q axis, as the current command values.

4. The inverter controller according to claim 1, wherein the current command value calculator calculates the first current command values based on a torque command value and the second command values based on the torque command value and an estimated speed, respectively, and outputs the first current command values or the second current command values, having a larger q axis component, as the current command values.

5. The inverter controller according to claim 1, wherein the current command value calculator compares a voltage value of the output voltage calculated based on the first current command values with the given value when determining whether the output voltage in accordance with the first current command values is lower than the given value.

6. The inverter controller according to claim 1, wherein the current command value calculator compares a d axis component of the first current command value with a d axis component of the second current command value when determining whether the output voltage in accordance with the first current command values is lower than the given value.

7. The inverter controller according to claim 3, wherein the current command value calculator compares a current phase angle of the first current command values with a current phase angle of the second current command values when determining which one of a current phase angle of the first current command value and a current phase angle of the second current command value is closer to a q axis.

8. The inverter controller according to claim 1, wherein when the output voltage is lower than the given value, the current command value calculator calculates a correction value based on an error between the output voltage and the given value, and adds the correction value to the current command value.

9. The inverter controller according to claim 1, further comprising
a torque command value calculator which calculates the torque command value based on a speed command value and the estimated speed.

10. The inverter controller according to claim 1, wherein the current command value calculator has a lower-limit limiter configured to limit a lower limit of the current command value.

11. The inverter controller according to claim 10, wherein the lower-limit limiter is set to make the output voltage at a lowest speed become the given value.

12. A motor driving system, comprising:
a motor;
an inverter circuit which drives the motor;
current detectors which detect current values output from the inverter circuit;
a current command value calculator which calculates current command values so that an output voltage generated by the motor based on a current output from the inverter circuit becomes equal to or more than a given value;
a voltage command value calculator which calculates voltage command values so that the current values become equal to the current command values; and
an estimator which estimates a rotational phase angle of the motor, based on the voltage command values and the current values,
wherein the current command value calculator calculates first current command values based on a torque command value and second current command values based on the torque command value and an estimated speed, respectively, determines whether the output voltage in accordance with the first current command values is lower than the given value, outputs the first current command values as the current command values when the output voltage in accordance with the first current command values is equal to or more than the given value, and outputs the second current command values as the current command values when the output voltage in accordance with the first current command values is lower than the given value.

* * * * *